(12) United States Patent
Antonelli et al.

(10) Patent No.: US 7,877,694 B2
(45) Date of Patent: Jan. 25, 2011

(54) HOSTED NOTIFICATIONS TEMPLATES

(75) Inventors: Jason Antonelli, Sammamish, WA (US); Ramu Movva, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1106 days.

(21) Appl. No.: 10/728,697

(22) Filed: Dec. 5, 2003

(65) Prior Publication Data

US 2005/0144266 A1 Jun. 30, 2005

(51) Int. Cl.
*G06F 3/00* (2006.01)
*G06F 3/01* (2006.01)

(52) U.S. Cl. .............. 715/746; 715/714; 715/738; 715/739; 715/744; 715/745

(58) Field of Classification Search .......... 715/790, 715/789, 805, 738, 739, 714, 772, 744, 745, 715/746, 802; 707/9, 6
See application file for complete search history.

(56) References Cited

U.S. PATENT DOCUMENTS

| | | | | |
|---|---|---|---|---|
| 5,754,939 A * | 5/1998 | Herz et al. | ............ | 455/3.04 |
| 5,915,001 A * | 6/1999 | Uppaluru | ............ | 379/88.22 |
| 6,047,327 A * | 4/2000 | Tso et al. | ............ | 709/232 |
| 6,269,369 B1 * | 7/2001 | Robertson | ............ | 707/10 |
| 6,459,913 B2 * | 10/2002 | Cloutier | ............ | 455/567 |
| 6,501,832 B1 * | 12/2002 | Saylor et al. | ............ | 379/88.04 |
| 6,741,980 B1 | 5/2004 | Langseth et al. | | |
| 6,763,384 B1 | 7/2004 | Gupta et al. | | |
| 6,766,362 B1 | 7/2004 | Miyasaka et al. | | |
| 6,816,878 B1 * | 11/2004 | Zimmers et al. | ............ | 709/200 |
| 7,127,232 B2 * | 10/2006 | O'Neil et al. | ............ | 455/408 |
| 7,133,869 B2 * | 11/2006 | Bryan et al. | ............ | 707/9 |
| 7,143,118 B2 * | 11/2006 | Eichstaedt et al. | ............ | 707/201 |
| 2001/0044275 A1 | 11/2001 | Yamaguchi | | |
| 2002/0042846 A1 * | 4/2002 | Bottan et al. | ............ | 709/249 |
| 2002/0065884 A1 * | 5/2002 | Donoho et al. | ............ | 709/204 |
| 2002/0073158 A1 | 6/2002 | Dalal et al. | | |
| 2002/0080948 A1 * | 6/2002 | Canali et al. | ............ | 379/229 |
| 2002/0087397 A1 | 7/2002 | Mazza | | |
| 2002/0087740 A1 * | 7/2002 | Castanho et al. | ............ | 709/318 |
| 2002/0090934 A1 * | 7/2002 | Mitchelmore | ............ | 455/412 |
| 2002/0107985 A1 | 8/2002 | Hwang et al. | | |

(Continued)

OTHER PUBLICATIONS

Wang et al., "The SIMBA User Alert Service Architecture for Dependable Alert Delivery," Proceedings of the International Conference on Dependable Systems and Networks, 2001, pp. 463-472, Institute of Electrical and Electronics Engineers, Inc., U.S.A.

(Continued)

*Primary Examiner*—Weilun Lo
*Assistant Examiner*—Nicholas Augustine
(74) *Attorney, Agent, or Firm*—Senniger Powers LLP

(57) ABSTRACT

Method and systems for generating notifications in a notifications system. A parameter-driven template received from a content provider contains one or more parameters related to a subscription for notifications. The notifications system enables an application based on the received template and executes it to map a recurring event to one or more subscribers as a function of the parameters specified by the content provider. In response to the recurring event, the notification system generates a notification. Other aspects of the invention relate to a computer-readable medium that defines the application for use in a notifications system.

21 Claims, 4 Drawing Sheets

U.S. PATENT DOCUMENTS

| | | | |
|---|---|---|---|
| 2002/0120711 A1 | 8/2002 | Bantz et al. | |
| 2002/0124182 A1 | 9/2002 | Bacso et al. | |
| 2002/0184092 A1 | 12/2002 | Cherry et al. | |
| 2003/0055897 A1* | 3/2003 | Brown et al. | 709/205 |
| 2003/0097485 A1 | 5/2003 | Horvitz et al. | |
| 2003/0100326 A1 | 5/2003 | Grube et al. | |
| 2003/0101190 A1 | 5/2003 | Horvitz et al. | |
| 2003/0110262 A1* | 6/2003 | Hasan et al. | 709/226 |
| 2003/0120785 A1 | 6/2003 | Young | |
| 2003/0131073 A1* | 7/2003 | Lucovsky et al. | 709/219 |
| 2003/0131142 A1 | 7/2003 | Horvitz et al. | |
| 2003/0135556 A1 | 7/2003 | Holdsworth | |
| 2003/0225683 A1* | 12/2003 | Hill et al. | 705/37 |
| 2004/0002972 A1* | 1/2004 | Pather et al. | 707/6 |
| 2005/0027741 A1* | 2/2005 | Eichstaedt et al. | 707/104.1 |
| 2005/0144266 A1* | 6/2005 | Antonelli et al. | 709/223 |

OTHER PUBLICATIONS

Miller et al., "News On-Demand for Multimedia Networks," Proceedings of the First ACM International Conference on Multimedia, 1993, pp. 383-392, ACM Press, New York, U.S.A.

Faensen et al., "Hermes: A Notification Service for Digital Libraries," Proceedings of the First ACM/IEEE-CS Joint Conference on Digital Libraries, 2001, pp. 373-380, ACM Press, New York, U.S.A.

Huang et al., "Publish/Subscribe in a Mobile Environment," Second ACM International Workshop on Data Engineering for Wireless and Mobile Access, 2001, pp. 27-34, ACM Press, New York, U.S.A.

Nielsen et al., "Web Services Routing Protocol (WS-Routing)," printed from http://msdn.micfosoft.com/library/en-us/dnglobspe/html/ws-routing.asp?frame=true, Oct. 23, 2001, 25 pages.

* cited by examiner

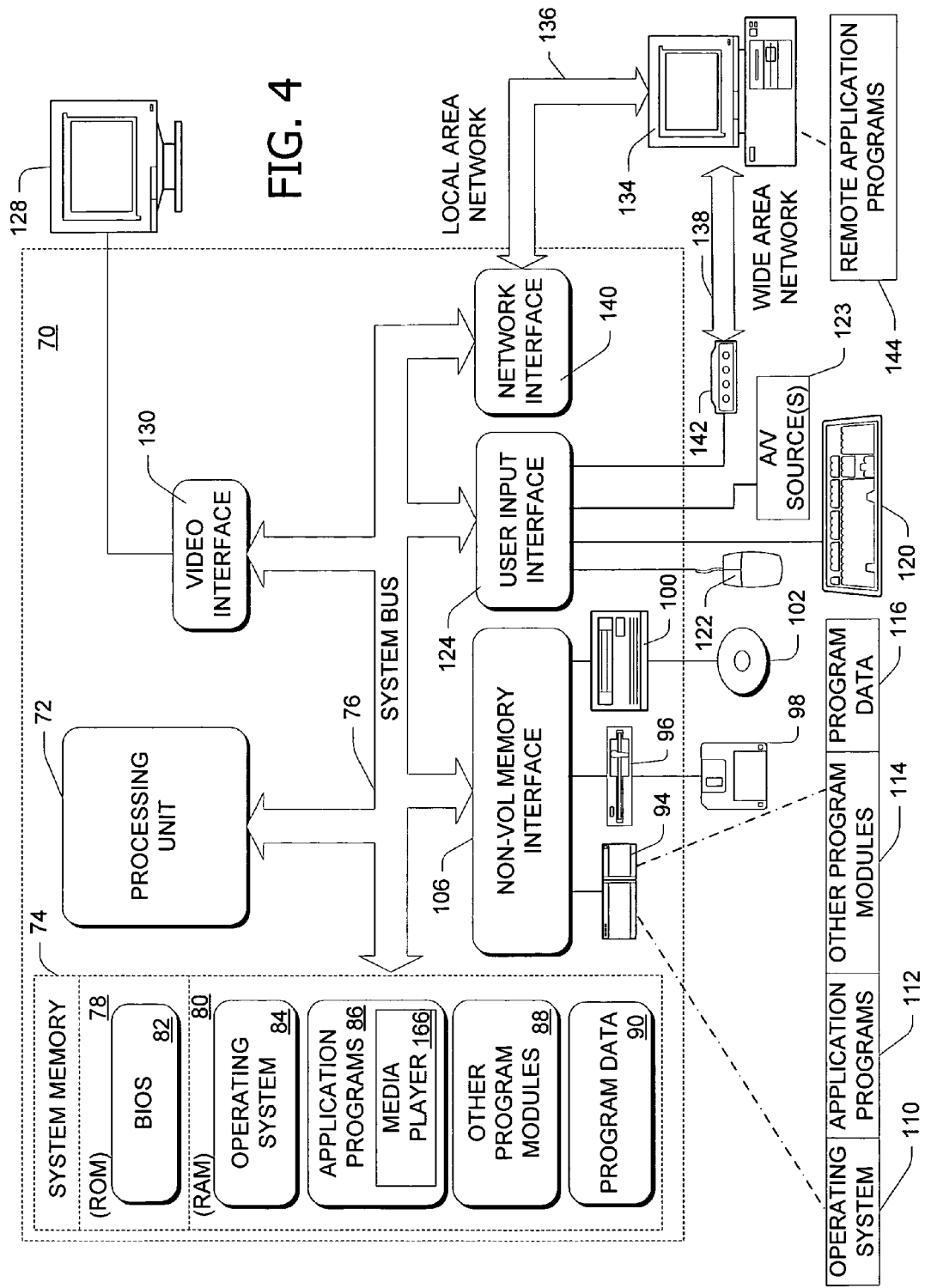

HOSTED NOTIFICATIONS TEMPLATES

TECHNICAL FIELD

Embodiments of the present invention relate to the field of software notifications. In particular, embodiments of this invention relate to implementing a template-based notification application use in generating notifications.

BACKGROUND OF THE INVENTION

Up-to-date information in a wide variety of areas is very important to many people. These people often desire to be alerted to time-sensitive events and information. Content providers generate content for notifications, which are then delivered to one or more user electronically (e.g., via electronic mail). For example, a news organization may provide notification content relating stock prices, breaking news, weather conditions, traffic conditions, etc. A user's expressed interest to receive electronic notifications for a particular class of content is generally called a notification subscription. Such subscriptions often are made between the end user and the content provider that sends the notifications. Event-driven notifications of this type are often referred to as alerts.

An alerts application typically consists of an event feed component, multiple subscription offerings, mapping of events to notifications for subscription offerings, a signup user interface, and final notification formatting to be delivered to subscribers. Disadvantageously, conventional alerts technology places a heavy burden on either the content providers or the alerts notification service for managing and generating notifications. A hosted alerts system is desired to quickly develop and host alerts applications based on content feeds from interested content providers. In such a system, however, content providers are required to develop a custom alerts application each time aspects of the application changes. This results in additional and undesirable development and deployment time. For example, the ability for a retailer to quickly and easily deploy a notification involving a new special offer involving certain goods to a particular set of subscribers in a matter of hours rather than weeks could provide a significant competitive advantage.

Accordingly, faster development and deployment of notifications is desired to address one or more of these and other disadvantages.

SUMMARY OF THE INVENTION

Embodiments of the invention overcome one or more deficiencies in the prior art by providing template-based notification applications for use in a hosted alerts environment. In one embodiment, the invention enables a template containing necessary information relating to an alerts subscription. By enabling the required logic based on the template, an exemplary notifications system can execute multiple applications without burdensome additional code development, testing, and deployment overhead. Moreover, the features of the present invention described herein are less laborious and easier to implement than currently available techniques as well as being economically feasible and commercially practical.

Briefly described, a method embodying aspects of the invention generates notifications in a notifications system. The notifications, which are sent to subscribers via a data communication network, contain content provided by one or more content providers. The method includes receiving a parameter-driven template from a content provider. The template contains one or more parameters related to a subscription for notifications specified by the content provider. The method also includes enabling a notifications application based on the received template and executing the notifications application. In this instance, the notifications application maps a recurring event to one or more subscribers as a function of the parameters specified by the content provider and a notification is generated and delivered to the subscribers in response to the recurring event.

In another embodiment, a computer-readable medium has a data structure stored thereon that defines an application for use in a notifications system. The notifications system is configured to execute the defined application for providing notifications to subscribers via a data communication network. The notifications contain content provided by one or more content providers. The data structure includes a scenario template configured to contain information for defining the application. In this embodiment, the scenario template has one or more parameters specified by the content provider and relating to a subscription for notifications. The data structure also includes a notification generation component responsive to an event feed for mapping a recurring event to one or more subscribers as a function of the parameters specified by the content provider and generating a notification for it. A delivery component then routes the notification to the subscribers.

Yet another embodiment relates to a system configured for generating and delivering notifications to subscribers via a data communication network. The system includes a computing device coupled to a data communication network and configured to receive a parameter-driven template from a content provider via the data communication network. The template contains information provided by the content provider and relating to a subscription for notifications. The system also includes a computer-readable medium that stores computer-executable instructions to be executed on the computing device to implement a notifications application based on the template. The notifications application maps a recurring event to one or more subscribers as a function of one or more parameters specified by the content provider and delivers the notification to the subscribers in response to the recurring event.

A notification system embodying aspects of the invention generates and delivers notifications to subscribers. The system includes a computing device coupled to a data communication network and configured to receive a parameter-driven template from a content provider via the data communication network. The template contains information provided by the content provider and relating to a subscription for notifications. The system also includes a subscription store associated with the computing device. The subscription store is configured to store one or more notification offerings described by an application definition file. The system also includes a computer-readable medium that stores computer-executable instructions to be executed on the computing device to implement a notifications application according to the application definition file. The notifications application delivers the notification to the subscribers in response to a recurring event.

Computer-readable media having computer-executable instructions for performing methods of notifications management embody further aspects of the invention.

Alternatively, the invention may comprise various other methods and apparatuses.

Other features will be in part apparent and in part pointed out hereinafter.

BRIEF DESCRIPTION OF THE DRAWINGS

FIG. 4 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
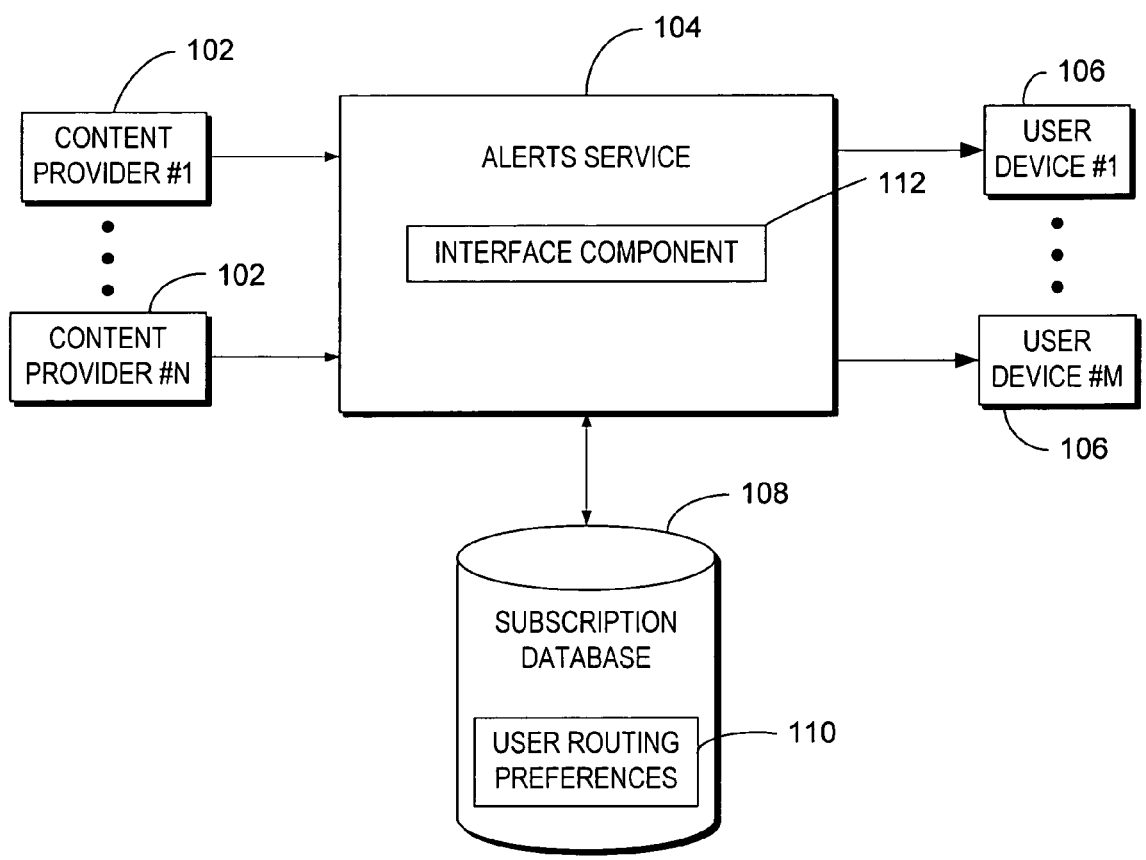
FIG. 1 is a block diagram illustrating one example of a suitable alerts service environment in which the invention may be implemented.

Referring first to FIG. 1, an exemplary block diagram illustrates one example of a suitable alerts service environment in which the invention may be implemented. FIG. 1 illustrates the communication flow between a content provider 102 such as content provider #1 through content provider #N, an alerts service 104, and a user device 106 such as user device #1 through user device #M. The content provider 102, the alerts service 104, and the user device 106 are coupled to a data communication network such as described with reference to FIG. 4. The content provider 102 sends a notification to the alerts service 104 for delivery to one or more of the user devices 106. Alerts service 104 accesses a subscription database 108 storing subscription information and user routing preferences 110 to determine which user device(s) 106 should receive the alert. Alerts service 104 then delivers the alert to the determined user device 106. In one example, the alerts service environment is referred to as a notification pipeline and database (NPD).

The alerts service 104 illustrated in FIG. 1 transcends any one particular transport medium for delivery of notifications. The invention may use any of a plurality of transport mediums such as electronic mail, instant messaging, mobile short-message-service messaging, wireless communications, etc.

Aspects of the present invention provide a hosted notification mechanism for greater versatility and usability. In general, a notifications system (i.e., alerts service 104) operating in accordance with embodiments of the invention sends a message, often referred to as a notification or alert, to a subscribing user via his or her specified user device 106. The message contains event-driven information from content provider 102 relevant to a topic of interest to which the user has signed up. In other words, a subscriber is a user or other entity that expresses an interest in a topic and receives notifications related to the topic from content provider 102. In one embodiment, the combination of a subscriber and a topic constitutes a subscription. Exemplary topics for alerts include news, weather, sports, finance, traffic, hobbies, bargains, and so forth. As described above, the notifications are usually driven by events such as breaking news, changes in weather or traffic conditions, auction outbid notices, etc.

In a de-centralized system, alert content providers 102 manage subscriber accounts, subscriptions, delivery of alerts, and the like. A hosted alerts system according to embodiments of the invention centralizes managing subscriber accounts and subscriptions so that content providers 102 can focus on providing content rather than operating an alerts management system. For example, content providers 102 send alert content to hosted alerts system 104 in a protocol such as Simple Object Access Protocol (SOAP). The hosted alerts system 104 determines which subscribers should receive the alert and then sends the alert to the appropriate subscribers. A set of protocols for notification-based applications based on SOAP, for example, provides the basis for a programming model for managing notification-based applications and serves as building blocks for a platform for such applications.

Notification-based applications may also be referred to as publisher/subscriber applications. In this instance, subscribers create subscriptions for the topics of interest to them. When an event occurs, a notification-based application matches the topic corresponding to the event with the subscriptions. The notification system then sends the appropriate notification to each subscriber for all of the matches. In general, a notifications application has components for the following: subscription store (and corresponding application programming interfaces (APIs)); external "event" feed (and corresponding APIs); notification generation by matching external events with the corresponding stored subscriptions; and delivery/routing of notifications; subscription management application.

Referring further to FIG. 1, alerts service 104 processes notification or alert information received via the data communication network from content provider 102. An interface component 112 receives a data packet representing the notification and alerts service 104 stores it in a memory area. In one example, the memory area includes a plurality of databases (not shown). The notification includes routing information and content. One or more computing devices associated with the alerts service 104 enable delivery of the stored notification to one or more subscribing users based on the routing information.

The user device 106 may be a computer such as computer 70 described with reference to FIG. 4. Further, user device 106 may execute an alerts application (e.g., an instant messaging application) that receives and processes alerts in a web-based notifications system. The alerts application executes on user device 106, which may also. be, for example, a cellular telephone (e.g., a Smartphone device), a pager, or a handheld computing device (e.g., a personal digital assistant or a Pocket PC device). Moreover, user device 106 may include any of the above exemplary devices enabled with an information service such as a SMART PERSONAL OBJECTS TECHNOLOGY (SPOT) brand of telecommunication service and/or devices. The information service comprises a computing infrastructure (e.g., a telecommunication service) for sending data and information to personal and home devices via computer networks, wireless networks and the Internet. User devices 106 that may be enabled with the information service include, but are not limited to, the following devices: clocks, alarm clocks, radios incorporating clocks, watches, billfolds, wallets, checkbook and passbook wallets, purses, pens, metal key rings, key holders, wireless devices, computer hardware (e.g., peripherals, monitors, and displays), electronic calendar devices, and refrigerator magnets. Further, magazines, books, and user manuals relating to computers, computer programs, personal information devices and wireless communications may also incorporate the information service. The information service enables billions of devices to communicate with each other. For example, customers select the type of information and services they want to receive on the enabled devices via a configuration web page. This content is subsequently beamed to and displayed on the device. Information available to users on devices using the information service includes personal messages, calendar updates, and customized news, weather, financial and sports information.

In one embodiment, the system shown in FIG. 1 is implemented as a web service and functionality associated with alerts service 104 may be distributed among one or more computers. For example, alerts service 104 may include a distributed processing system. When content provider 102 posts an alert such as in the form of an extensible markup language (XML) document, alerts service 104 parses the alert and validates the packet. Alerts service 104 may also asynchronously process the alert by queuing it into an NPD queue or other memory area. The NPD queue represents an internal queue of work items that are acted upon by any one of the multiple threads in the thread pool, but only one thread processes the item at any given time. The alerts service 104 then retrieves information regarding, for example, a specific broadcast list specified in the alert, such as the number of members or users, and an internal 32-bit row identifier from a database such as a broadcast list database (BLDB) (not shown). A web services component (e.g., an ASP.NET web service), for example, embodying a subscription management web service manipulates a user profile database (UPDB) or user profile store (UPS) (not shown) to obtain information regarding the subscribing user based on the notification information received from content provider 102.

Figure 2:
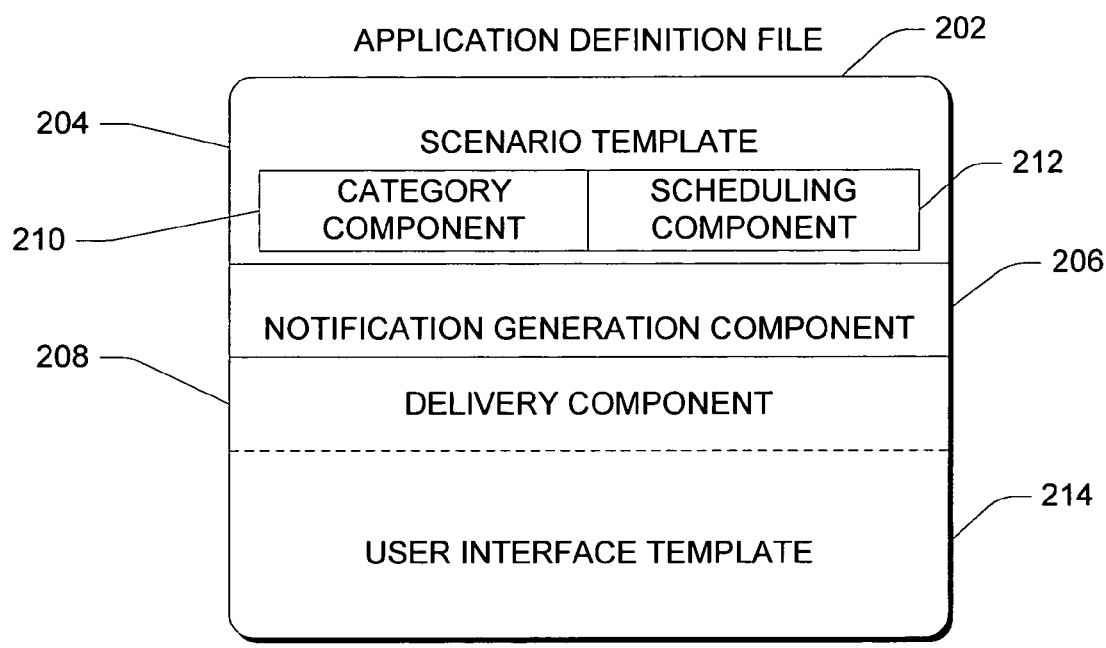
FIG. 2 is an exemplary block diagram illustrating a computer-readable medium according to one embodiment of the invention.

Referring now to FIG. 2, a computer-readable medium storing a data structure embodies application definition file 202. The application definition file 202 defines an application for use in a notifications system, such as alerts system 104. In particular, alerts system 104 in this embodiment is configured to execute the defined application for providing notifications to subscribers via a data communication network. Application definition file 202 includes a scenario template 204 configured to contain information for defining the application. The scenario template 204 of FIG. 2 has one or more parameters specified by content provider 102 and relating to a subscription for notifications. A notification generation component 206 responsive to an event feed maps a recurring event to one or more subscribers as a function of the parameters specified by content provider 102, which in turn yields a notification. Application definition file 202 also includes a delivery component 208 for routing the notification to the subscribers.

As shown in FIG. 2, scenario template 204 of application definition file 202 includes a category component 210 for defining a category of events for which the notifications are to be generated and a scheduling component 212 for defining when the notifications are to be delivered. For example, one of the parameters specified by content provider 102 may relate to delivery of the notifications at a predetermined time of day and another one of the parameters specified by content provider 102 may relate to delivery of the notifications upon occurrence of the recurring event.

Thus, applications may be completely defined through metadata described in application definition file 202. Additional code need not be written once the basic code is written to handle applications and the corresponding scenario templates 204. This is a key to delivering many alerting applications quickly without custom coding, testing, and deployment.

Although scenario template 204 is described in the context of category component 210 in the embodiment of FIG. 2, alternative embodiments of the present invention may be used to enable applications other than category-based applications. For example, in a threshold-based application, category component 210 may be replaced by a stock component for enabling determination of when a stock hits a certain price, i.e., a threshold. In a further embodiment, a user interface template 214 is configured to contain information for defining a user interface corresponding to the application for managing the subscription.

Further aspects of application definition file 202 are described in greater detail below.

Figure 3:
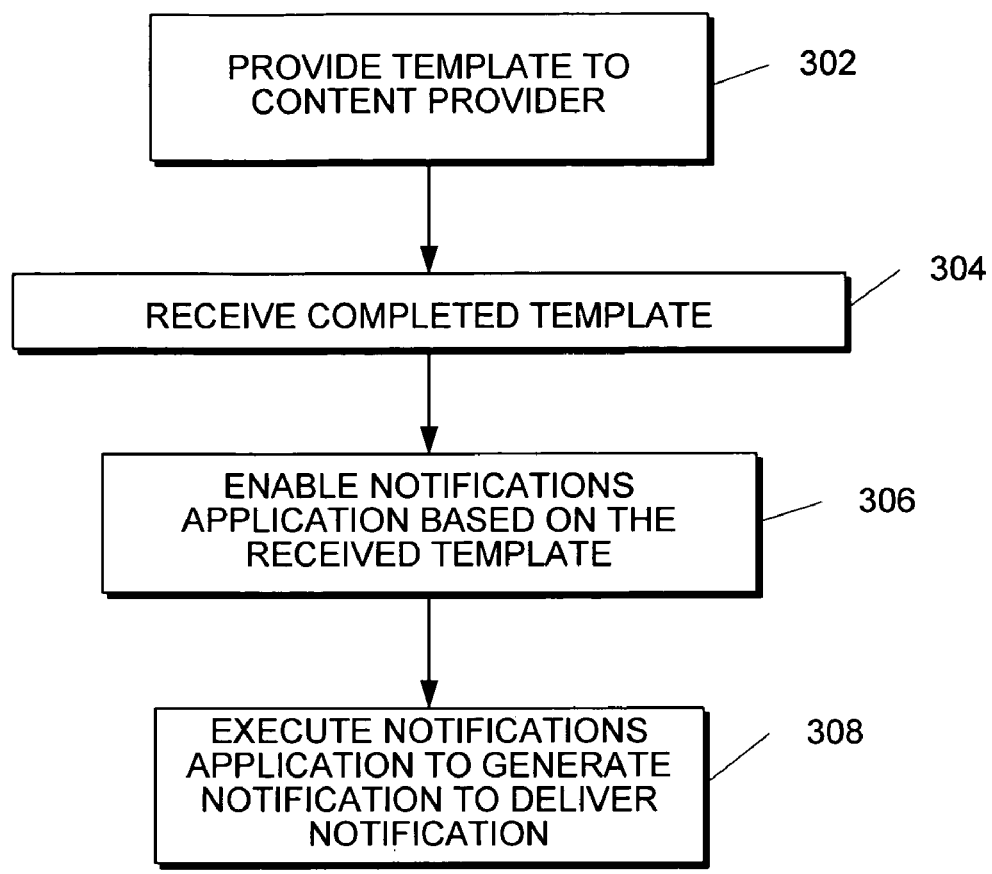
FIG. 3 is an exemplary flow diagram illustrating operation according to one embodiment of the invention.

FIG. 3 illustrates a method of generating notifications in a notifications system in the form of an exemplary flow diagram. In FIG. 3 notifications system 104 is configured to provide notifications to subscribers via a data communication network. The notifications contain content provided by one or more content providers 102. Beginning at 302, hosted alerts service 104 provides a parameter-driven template to content provider 102 for completion. In certain embodiments of the invention, scenario template 204 or user interface template 214 is part of the parameter-driven template. At 304, the template is received from content provider 102 (e.g., by alerts service 104). The template in this embodiment contains one or more parameters specified by content provider 102 and relating to a subscription for notifications. Proceeding to 306, a notifications application based on the received template is enabled. In other words, alerts system 104 enables a notifications application based on application definition file 202 (i.e., new code need not be implemented).

Enabling the application includes defining, with the template, a category of events for which the notifications are to be generated and when the notifications are to be delivered. For example, alerts service 104 matches a most recent instance of the recurring event to the subscription to generate the notifications for delivery at a user-defined, scheduled predetermined time of day. In another example, alerts service 104 matches the recurring event to the subscription to generate the notifications for broadcast delivery upon occurrence of the recurring event. The notifications application in this instance maps a recurring event to one or more subscribers as a function of the parameters specified by content provider 102.

FIG. 3 further illustrates at 308 executing the notifications application to generate a notification in response to the recurring event and to deliver the notification to the subscribers.

A hosted alerts system embodying aspects of the invention, such as alerts service 104, quickly develops and hosts notifications applications based on content feeds from content providers 102. Hosted alerts in this instance take on the burden of managing user's content subscriptions and generating alerts, which permits content providers 102 to focus on aggregating, editorializing, transforming, and publishing rich content. According to embodiments of the invention, the use of scenario templates 204 minimizes the development and deployment time of event-driven notifications.

Alerts or notifications applications generally include components relating to event feeds, multiple subscription offerings, event to notification mapping for subscription offerings, signup user interfaces, and final notification formatting to be delivered to subscribers. Scenario template 204 advantageously contains necessary information relating to an individual subscription such that hosted alerts applications can choose between multiple scenario templates supported. Alerts service 104 implements the required logic based on scenario template 204 and multiple applications can utilize them without further code development and testing and without significant increases in deployment overhead.

Embodiments of the present invention employ an application that includes reusable, predefined scenario templates 204 among other things. Scenario templates 204 are building blocks that can be specialized through parameters to represent a single alert offering. The full description of the application is found in the application definition file 202. Given a set of application definition files 202, alerts service 104 provides a full set of components for the alerting applications that described by the application definition files. Specifically, for each application definition file 202, a subscription store stores the user's notification subscriptions described by the scenarios defined with the application and a provisioning script provisions the applications in the alerts system.

In addition, middle tier subscription APIs may be driven off of application definition file 202 to validate incoming subscription management requests and to commit them to the subscription store. Similarly, middle tier eventing APIs may be driven off of application definition file 202 to validate incoming event management requests and to commit them to the event store. Jobs/processes are configured in one embodiment of the invention to generate notifications based on the matching external events with the corresponding subscriptions and to deliver the notifications to the core alerts service 104 delivery/routing mechanism.

In yet another embodiment of the invention, a web site may be driven off of application definition file 202 to provide a user interface with which end users could interact to create, update, and delete subscriptions.

Referring now to specific examples embodying aspects of the invention, many alerting offerings share the same basic schema such that they can be defined in terms of predefined scenario templates 204. For example, a Category-Based Scheduled scenario template provides subscriptions to be defined in terms of subscribing to a specific category (or channel) of notifications to be delivered at a predetermined time of day. In this instance, event feeds including the full "alert" to be sent are expected to come in for each category or channel on a recurring basis. Notifications are generated based on matching the latest event of a given category with the subscriptions for the same category at the predefined schedule time.

In another example, a Category-Based Broadcast scenario template provides subscriptions to be defined in terms of subscribing to a specific category (or channel) of notifications to be delivered at a time that they occurred. Again, event feeds including the full "alert" to be sent are expected to come in for each category on a recurring basis. Notifications are generated based on matching each event of a given category with the subscriptions for that category at the time the event is submitted to hosted alerts service 104.

The following are examples of alert offerings that may be provided using a scenario template model:

Horoscope: Users sign up for a given horoscope sign at a given time of day for a given set of days each week. This offering may be implemented using a category-based scheduled scenario template 204 where the category represents the horoscope sign.

Lottery: Users sign up for lottery results of a given state at a given time of day for a given set of days each week. This offering may be implemented using a category-based scheduled scenario template 204 where the category represents the state.

News: Users either sign up for summary news or headline news or both for a given topic of news (e.g. Top Stories, Sports, International, etc.) for a given time of day for a given set of days each week. This offering may be implemented using two instances of a category-based scheduled scenario template 204 where the category for each represents the topic of news. The first instance of the category-based scheduled scenario template represents summary news and the second instance represents headline news.

Although major components of a notifications application can be defined in terms of scenario templates 204 (e.g., subscription store, generation matching logic, etc.), user interface template 214 provides an additional level of abstraction for building a subscription management application. User interface templates 214 are templates that define a user interface to manage subscriptions for a given application.

In one embodiment of the invention, a single alerting system brings any number of alert offerings implemented via parameterized scenario templates 204. Accordingly, some flexibility to define how the various alert offerings are presented to the user for a given application is desired. For example, user interface template 214 applied independently of scenario templates 204 permit a user to sign up for multiple types of alert offerings that are similar (e.g., summary news and headline news that shared the same categories) at the same time.

Referring now to a specific example of user interface templates 214, a Category-Based Scheduled user interface template manages subscriptions for one or more Category-Based Scheduled scenario templates 204 that share the same category lists among all category-based schedule scenarios. For example, such a user interface template 214 shows the list of categories just once but still allows managing either type of subscriptions.

User interface templates 214 are parameterized to specify the names of the scenarios as well as the localized text to plug in throughout the user interface. The user interface, for example, includes web pages accessible over network such as the Internet. In this instance, a single set of ASP.NET-based web pages for each user interface template 214 with mechanisms to access the parameters of application definition files 202 may be programmatically customized according to the parameters given for the application.

According to embodiments of the invention, each application also includes additional information to provision the application in the delivery/routing alert system (e.g., core alerts service 104). The additional information contains the additional parameters used to "provision" the application in the alerts system.

APPENDIX A describes an exemplary application definition file schema according to embodiments of the invention. For example, the schema of APPENDIX A constitutes a parameter-driven template. APPENDIX B provides an example of an application definition file according to the schema of APPENDIX A (i.e., an example of a template returned by content provider 102).

FIG. 4 shows one example of a general purpose computing device in the form of a computer 70. In one embodiment of the invention, a computer such as the computer 70 is suitable for use in alerts service 104.

In the illustrated embodiments, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that may be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during start-up, is typically stored in ROM 78. The RAM 80 typically contains data and/or program modules that are immediately accessible to and/or presently being operated on by processing unit 72. By way of example, and not limitation, FIG. 4 illustrates operating system 84, application programs 86, other program modules 88, and program data 90.

The computer 70 may also include other removable/non-removable, volatile/nonvolatile computer storage media. For example, FIG. 4 illustrates a hard disk drive 94 that reads from or writes to non-removable, nonvolatile magnetic media. FIG. 4 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 84, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 4, provide storage of computer readable instructions, data structures, program modules and other data for the computer 70. In FIG. 4, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices or user interface selection devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 4 include a local area network (LAN) 136 and a wide area network (WAN) 138, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 134, or other appropriate mechanism. In a networked environment, program modules depicted relative to computer 70, or portions thereof, may be stored in a remote memory storage device (not shown). By way of example, and not limitation, FIG. 4 illustrates remote application programs 144 as residing on the memory device. The network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 70 executes computer-executable instructions such as those described herein to receive a parameter-driven template, including scenario template 204, from content provider 102. Computer 70, in this exemplary embodiment, enables a notifications application based on the received template and executes the notifications application. In this instance, the notifications application maps a recurring event to one or more subscribers as a function of the parameters specified by content provider 102 and computer 70 generates a notification and delivers it to the subscribers in response to the recurring event.

The order of execution or performance of the methods illustrated and described herein is not essential, unless otherwise specified. That is, elements of the methods may be performed in any order, unless otherwise specified, and that the methods may include more or less elements than those disclosed herein.

Information in this document, including uniform resource locator and other Internet web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

Appendix A

Application Definition File Schema

An exemplary XSD schema used to define an application according to embodiments of the invention follows.

```
<?xml version="1.0" encoding="utf-8" ?>
<xs:schema
targetNamespace="http://alerts.microsoft.com/hosted/2003/07/application"
elementFormDefault="qualified"
    xmlns="http://alerts.microsoft.com/hosted/2003/07/application"
xmlns:mstns="http://alerts.microsoft.com/hosted/2003/07/application"
    xmlns:xs="http://www.w3.org/2001/XMLSchema">
    <xs:simpleType name="Category_t">
        <xs:restriction base="xs:string">
            <xs:maxLength value="16" />
        </xs:restriction>
    </xs:simpleType>
    <xs:complexType name="CpInfo_t">
        <xs:sequence>
            <xs:element name="Cpid" type="xs:integer" />
            <xs:element name="Password" type="xs:string" />
            <xs:element name="Uri" type="xs:anyURI" />
            <xs:element name="ReplyToEmail" type="xs:string" />
            <xs:element name="DefaultMarket" type="xs:string" />
        </xs:sequence>
    </xs:complexType>
    <xs:complexType name="Categories_t">
        <xs:sequence>
            <xs:element name="Category" type="Category_t" minOccurs="0" maxOccurs="unbounded" />
        </xs:sequence>
```

```
            </xs:complexType>
            <xs:complexType name="Locales_t">
                <xs:sequence>
                    <xs:element name="Locale" type="xs:string" minOccurs="0" maxOccurs="unbounded" />
                </xs:sequence>
            </xs:complexType>
            <xs:complexType name="PageText_t">
                <xs:sequence>
                    <xs:element name="HomePage_Heading" type="xs:string" />
                    <xs:element name="HomePage_SubHead" type="xs:string" />
                    <xs:element name="HomePage_BulletTwo" type="xs:string" />
                    <xs:element name="ViewPage_Heading" type="xs:string" />
                    <xs:element name="ViewPage_SubHead" type="xs:string" />
                    <xs:element name="ViewPage_CatHead" type="xs:string" />
                    <xs:element name="ViewPage_SchedHead" type="xs:string" />
                    <xs:element name="EditPage_Heading" type="xs:string" />
                    <xs:element name="EditPage_SubHead" type="xs:string" />
                    <xs:element name="AddPage_Heading" type="xs:string" />
                    <xs:element name="AddPage_SubHead" type="xs:string" />
                    <xs:element name="AddPage_ChooseCat" type="xs:string" />
                    <xs:element name="AddPage_ChooseTime" type="xs:string" />
                </xs:sequence>
            </xs:complexType>
            <xs:complexType name="CategoryBasedScheduleScenario_t">
                <xs:sequence>
                    <xs:element name="Categories" type="Categories_t" />
                </xs:sequence>
            </xs:complexType>
            <xs:complexType name="Scenario_t">
                <xs:sequence>
                    <xs:element name="Locales" type="Locales_t" />
                    <xs:choice>
                        <xs:element name="CategoryBasedScheduleScenario" type="CategoryBasedScheduleScenario_t" />
                    </xs:choice>
                </xs:sequence>
                <xs:attribute name="name" type="xs:string" use="required" />
                <xs:attribute name="type" type="xs:string" use="required" />
            </xs:complexType>
            <xs:complexType name="Schema_t">
                <xs:sequence>
                    <xs:element name="Scenario" type="Scenario_t" minOccurs="0" maxOccurs="unbounded" />
                </xs:sequence>
            </xs:complexType>
            <xs:complexType name="UICpInfo_t">
                <xs:sequence>
                    <xs:element name="Name" type="xs:string" />
                    <xs:element name="SignupText" type="xs:string" />
                    <xs:element name="SignupImage" type="xs:string" />
                    <xs:element name="Icon" type="xs:string" />
                </xs:sequence>
            </xs:complexType>
            <xs:complexType name="UICategory_t">
                <xs:sequence>
                    <xs:element name="Category" type="xs:string" />
                    <xs:element name="Display" type="xs:string" />
                </xs:sequence>
            </xs:complexType>
            <xs:complexType name="UICategories_t">
                <xs:sequence>
                    <xs:element name="Category" type="UICategory_t" minOccurs="0" maxOccurs="unbounded" />
                </xs:sequence>
            </xs:complexType>
            <xs:complexType name="UIScenario_t">
                <xs:sequence>
                    <xs:element name="Scenario" type="xs:string" />
                    <xs:element name="Display" type="xs:string" />
                </xs:sequence>
            </xs:complexType>
            <xs:complexType name="UIScenarios_t">
                <xs:sequence>
                    <xs:element name="Scenario" type="UIScenario_t" minOccurs="0" maxOccurs="unbounded" />
                </xs:sequence>
            </xs:complexType>
            <xs:complexType name="UICategoryBasedSchedule_t">
                <xs:sequence>
                    <xs:element name="DisplayName" type="xs:string" />
                    <xs:element name="LogoGraphic" type="xs:string" />
                    <xs:element name="PageText" type="PageText_t" />
                    <xs:element name="Scenarios" type="UIScenarios_t" />
                    <xs:element name="Categories" type="UICategories_t" />
                </xs:sequence>
            </xs:complexType>
            <xs:complexType name="UISubscription_t">
                <xs:choice>
                    <xs:element name="CategoryBasedSchedule" type="UICategoryBasedSchedule_t" />
                </xs:choice>
                <xs:attribute name="type" type="xs:string" use="required" />
            </xs:complexType>
            <xs:complexType name="UserInterface_t">
                <xs:sequence>
                    <xs:element name="CpInfo" type="UICpInfo_t" />
                    <xs:element name="Subscription" type="UISubscription_t" />
                </xs:sequence>
                <xs:attribute ref="xml:lang" use="required" />
            </xs:complexType>
            <xs:complexType name="UserInterfaces_t">
                <xs:sequence>
                    <xs:element name="UserInterface" type="UserInterface_t" minOccurs="1" maxOccurs="unbounded" />
                </xs:sequence>
            </xs:complexType>
            <xs:complexType name="Application_t">
                <xs:sequence>
                    <xs:element name="CpInfo" type="CpInfo_t" />
                    <xs:element name="Schema" type="Schema_t" />
                    <xs:element name="UserInterfaces" type="UserInterfaces_t"/>
                </xs:sequence>
            </xs:complexType>
            <xs:element name="Application" type="Application_t" />
</xs:schema>
```

Appendix B

Sample Application Definition File

An exemplary Application Definition file used to deliver news is shown below. The Application Definition file follows the exemplary schema shown above in APPENDIX A.

```xml
<?xml version="1.0" encoding="utf-8" ?>
<Application xmlns="http://alerts.microsoft.com/hosted/2003/07/application">
    <CpInfo>
        <Cpid>716</Cpid>
        <Password>password</Password>
        <Uri>http://localhost</Uri>
        <ReplyToEmail></ReplyToEmail>
        <DefaultMarket>en-US</DefaultMarket>
    </CpInfo>
```

-continued

```
<Schema>
   <Scenario name="HeadlineNews" type="CategoryBasedSchedule">
      <Locales>
         <Locale>en-US</Locale>
         <Locale>en-CA</Locale>
         <Locale>fr-CA</Locale>
      </Locales>
      <CategoryBasedScheduleScenario>
         <Categories>
            <Category>Top</Category>
            <Category>Nat</Category>
            <Category>Int</Category>
            <Category>Spo</Category>
            <Category>Pol</Category>
            <Category>Bus</Category>
            <Category>Ent</Category>
            <Category>S&H</Category>
            <Category>C&T</Category>
         </Categories>
      </CategoryBasedScheduleScenario>
   </Scenario>
   <Scenario name="SummaryNews" type="CategoryBasedSchedule">
      <Locales>
         <Locale>en-US</Locale>
         <Locale>en-CA</Locale>
         <Locale>fr-CA</Locale>
      </Locales>
      <CategoryBasedScheduleScenario>
         <Categories>
            <Category>Top</Category>
            <Category>Nat</Category>
            <Category>Int</Category>
            <Category>Spo</Category>
            <Category>Pol</Category>
            <Category>Bus</Category>
            <Category>Ent</Category>
            <Category>S&H</Category>
            <Category>C&T</Category>
         </Categories>
      </CategoryBasedScheduleScenario>
   </Scenario>
</Schema>
<UserInterfaces>
   <UserInterface xml:lang="en-US" _locID="L_LocaleID_TEXT"
_locAttrData="xml:lang"
xmlns="http://alerts.microsoft.com/hosted/2003/07/application">
      <CpInfo>
         <Name _locID="L_CpInfo_Name_TEXT">MSN News</Name>
         <SignupText _locID="L_CpInfo_SignupText_TEXT">What's happening in the
world today? Find out now with MSN News alerts.</SignupText>
         <SignupImage _loc="locNone">news53x20.gif</SignupImage>
         <Icon _loc="locNone">news_24x16.gif</Icon>
      </CpInfo>
      <Subscription type="CategoryBasedSchedule">
         <CategoryBasedSchedule>
            <DisplayName _locID="L_CpDisplayName_TEXT"><!--
_locComment_text="The cp name as it will appear on the website pages"-->MSN
News</DisplayName>
            <LogoGraphic _loc="locNone">news_large.gif</LogoGraphic>
            <PageText>
               <HomePage_Heading _locID="L_HomePageHeading_TEXT"><!--
_locComment_text="Home page Header text"-->Sign up for free alerts from MSN
News</HomePage_Heading>
               <HomePage_SubHead _locID="L_HomePageSubHead_TEXT"><!--
_locComment_text="Instruction text under heading on home page"-->What's
happening in the world today? Find out now with MSN News
alerts.</HomePage_SubHead>
               <HomePage_BulletTwo _locID="L_HomePageBulletTwo_TEXT"><!--
_locComment_text="The second_u98 ?ullet text on home page"-->Select news
alert categories, then choose delivery times and days.</HomePage_BulletTwo>
               <ViewPage_Heading _locID="L_ViewPageHeading_TEXT"><!--
_locComment_text="View page header text"-->Your MSN News
alerts</ViewPage_Heading>
               <ViewPage_SubHead _locID="L_ViewPageSubHead_TEXT"><!--
_locComment_text="View page instruction text under heading"-->Click Edit
Delivery to change the delivery locations for all MSN News alerts. Click
Edit to change delivery times for individual alerts.</ViewPage_SubHead>
               <ViewPage_CatHead _locID="L_ViewPageCatHead_TEXT"><!--
_locComment_text="View page category column heading text"-->News
```

-continued

```
Category</ViewPage_CatHead>
            <ViewPage_SchedHead _locID="L_ViewPageSchedHead_TEXT"><!--
_locComment_text="View page in edit mode heading for times"-->Alert
Me</ViewPage_SchedHead>
            <EditPage_Heading _locID="L_EditPageHeading_TEXT"><!--
_locComment_text="Edit page header text"-->Edit your MSN News
alerts</EditPage_Heading>
            <EditPage_SubHead _locID="L_EditPageSubHead_TEXT"><!--
_locComment_text="Edit page instruction text under heading"-->Make your
changes and click Update.</EditPage_SubHead>
            <AddPage_Heading _locID="L_AddPageHeading_TEXT"><!--
_locComment_text="Add page header text"-->What MSN News alerts do you want to
receive?</AddPage_Heading>
            <AddPage_SubHead _locID="L_AddPageSubHead_TEXT"><!--
_locComment_text="Add page instruction text under heading"-->Select check
boxes next to news categories, then choose delivery times and
days.</AddPage_SubHead>
            <AddPage_ChooseCat _locID="L_AddPageChooseCat_TEXT"><!--
_locComment_text="Add page heading text for category section"-->Choose news
categories</AddPage_ChooseCat>
            <AddPage_ChooseTime _locID="L_AddPageChooseTime_TEXT "><!--
_locComment_text="Add page heading text for schedule section"-->Specify
delivery times and days</AddPage_ChooseTime>
        </PageText>
        <Scenarios>
            <Scenario>
                <Scenario _loc="locNone">HeadlineNews</Scenario>
                <Display _locID="L_HeadlineNewsScenario_TEXT">News
headlines</Display>
            </Scenario>
            <Scenario>
                <Scenario _loc="locNone">SummaryNews</Scenario>
                <Display _locID="L_SummaryNewsScenario_TEXT">News
summaries</Display>
            </Scenario>
        </Scenarios>
        <Categories>
            <Category>
                <Category _loc="locNone">Top</Category>
                <Display _locID="L_CategoryTopStories_TEXT">Top
Stories</Display>
            </Category>
            <Category>
                <Category _loc="locNone">Nat</Category>
                <Display _locID="L_CategoryNational_TEXT">National</Display>
            </Category>
            <Category>
                <Category _loc="locNone">Int</Category>
                <Display
_locID="L_CategoryInternational_TEXT">International</Display>
            </Category>
            <Category>
                <Category _loc="locNone">Spo</Category>
                <Display _locID="L_CategorySports_TEXT">Sports</Display>
            </Category>
            <Category>
                <Category _loc="locNone">Pol</Category>
                <Display _locID="L_CategoryPolitics_TEXT">Politics</Display>
            </Category>
            <Category>
                <Category _loc="locNone">Bus</Category>
                <Display _locID="L_CategoryBusiness_TEXT">Business</Display>
            </Category>
            <Category>
                <Category _loc="locNone">Ent</Category>
                <Display
_locID="L_CategoryEntertainment_TEXT">Entertainment</Display>
            </Category>
            <Category>
                <Category _loc="locNone">S&H</Category>
                <Display _locID="L_CategoryScienceHealth_TEXT">Science &
Health</Display>
            </Category>
            <Category>
```

```
            <Category _loc="locNone">C&T</Category>
            <Display _locID="L _CategoryComputersTechnology_TEXT">Computers
& Technology</Display>
          </Category>
        </Categories>
      </CategoryBasedSchedule>
    </Subscription>
  </UserInterface>
</UserInterfaces>
</Application>
```

What is claimed is:

1. A method of generating notifications in a notifications system, said notifications system being configured to provide notifications to subscribers via a data communication network, said notifications containing content provided by a plurality of content providers, said method comprising:

provic a parameter-driven template to the plurality of content providers for completion by the content providers;

receiving a parameter-driven template from at least one of the plurality of content providers, said received template relating to a category specified by the content provider, said received template containing one or more parameters specified by the content provider, said parameters defining a plurality of events specified by the content provider and relating to the specified category, each of said events comprising a recurring event specified by the content provider, said parameters relating to a subscription for notifications and specifying a predefined scheduled generation time for the generation of notifications to occur, wherein one of the parameters in the received parameter-driven template relates to delivery of the generated notifications at a predetermined time of day specified by the content provider;

enabling a notifications application based on the received template, said notifications application mapping the latest recurring event of the specified category to one or more subscribers as a function of the parameters specified by the content provider in the received parameter-driven template provided by the content provider, wherein enabling the notifications application based on the received template includes creating an application definition file that describes the notifications application;

executing the notifications application on a recurring basis to generate a notification in accordance with the predefined scheduled generation time specified by the received parameter-driven template parameters, wherein the notification is generated based on matching the latest recurring event of the specified category with subscribers of the specified category, and wherein the generated notification is delivered to the subscribers of the specified category on a recurring basis in accordance with the time of day delivery parameter specified by the received parameter-driven template; and providing a user interface for the subscribers to manage the subscription whereby the managed subscription has parameters corresponding to the received parameter-driven template received from the content provider.

2. The method of claim 1, further comprising matching a most recent instance of the recurring event to the subscription to generate the notifications for delivery at the predetermined time of day.

3. The method of claim 1, wherein one of the parameters specified by the content provider relates to delivery of the notifications upon occurrence of the recurring event.

4. The method of claim 3, further comprising matching the recurring event to the subscription to generate the notifications for broadcast delivery upon occurrence of the recurring event.

5. The method of claim 1, wherein the notifications relate to one or more of following categories: horoscope, lottery, and news.

6. The method of claim 1, further comprising defining the template based on common features of a plurality of notifications applications.

7. One or more computer-readable storage media having computer-executable instructions for performing the method of claim 1.

8. A computer-readable storage medium having a data structure stored thereon, said data structure defining an application for use in a notifications system, said notifications system being configured to execute the defined application for providing notifications to subscribers via a data communication network, said notifications containing content provided by a plurality of content providers, said data structure comprising:

a user interface template configured to contain information for defining a user interface corresponding to the application for managing the subscription of the user, said interface allowing the user to select a category, wherein a subscription is generated for the user from the user interface template, said subscription indicating that the user wants to receive notifications related to the selected category;

a scenario template configured to contain information for defining the application, said scenario template receiving from one of the plurality of content providers having one or more parameters specified by the content provider and relating to a subscription for notifications, wherein one of the parameters in the scenario template relates to delivery of the notifications at a predetermined time of day specified by the content provider, wherein the scenario template includes a category component defining a plurality of events specified by the content provider and relating to a category specified by the content provider, for which the notifications are to be generated, each of said events relating to a recurring event specified by the content provider;

a notification generation component responsive to an event feed for mapping a latest recurring event to one or more subscribers as a function of the parameters specified by the content provider in the scenario template provided by the content provider and as a function of the subscription of the subscriber, said notification generation component generating a notification for the recurring event in accordance with a predefined scheduled time specified for notification generation by the scenario template parameters, wherein the notification is generated based on matching the latest recurring event of the specified category with subscribers of the specified category; and
a delivery component for routing the notification to the subscribers of the specified category related to the event, wherein the notification is routed to the subscribers of the specified category in accordance with a time of day delivery parameter specified by the scenario template parameters.

9. The medium of claim 8, wherein the notifications relate to one or more of following topics: horoscope, lottery, and news.

10. The medium of claim 8, wherein the scenario template is based on common features of a plurality of notifications applications.

11. A system configured for generating and delivering notifications to subscribers via a data communication network, said notifications containing content provided by a plurality of content providers, said system comprising:
a computing device coupled to a data communication network and configured to:
receive a subscription from a subscriber specifying a category for which the subscriber wants to receive notifications of events relating to the specified category;
provide a parameter-driven template to the plurality of content providers for completion by the content providers;
receive the parameter-driven template from one of the plurality a content provider via the data communication network, said received template containing information provided by the content provider and relating to a subscription for notifications, said received template relating to a category specified by the content provider, said received template containing one or more parameters specified by the content provider, said parameters defining a plurality of events specified by the content provider and relating to the category, wherein one of the parameters in the received parameter-driven template relates to delivery of the notifications at a predetermined time of day specified by the content provider, each of said events relating to a recurring event specified by the content provider, said parameters relating to a subscription for notifications and specifying a predefined scheduled generation time for generation of the notifications to occur;
a computer-readable medium storing computer-executable instructions to be executed on the computing device to enable a notifications application based on the received template, said notifications application mapping the latest recurring event to one or more subscribers as a function of the parameters specified by the content provider in the received parameter-driven template provided by the content provider on a recurring basis in accordance with the predefined scheduled generation time defined by the received parameter-driven template parameters, wherein the notification is generated based on matching the latest recurring event of the specified category with subscribers of the specified category, and wherein the generated notification is delivered to the subscribers in accordance with the time of day delivery parameter specified by the received parameter-driven template parameters.

12. The system of claim 11, wherein the computing device is further configured to receive another parameter-driven template from the content provider via the data communication network, said other template containing information provided by the content provider and defining a user interface corresponding to the application for managing the subscription.

13. The system of claim 11, wherein the notifications relate to one or more of following topics: horoscope, lottery, and news.

14. The system of claim 11, wherein the template is based on common features of a plurality of notifications applications.

15. The system of claim 11, wherein the computer-readable medium further stores computer-executable instructions to be executed on the computing device to create an application definition file that describes the notifications application.

16. The system of claim 15, further comprising a subscription store configured to store notification offerings described by the application definition file.

17. The system of claim 16, wherein the computer-readable medium further stores computer-executable instructions to be executed on the computing device to validate incoming subscription management requests and commit the requests to the subscription store.

18. The system of claim 11, wherein the computer-readable medium further stores computer-executable instructions to be executed on the computing device to generate the notification based on matching external events with corresponding subscriptions.

19. The system of claim 11, wherein the computer-readable medium further stores computer-executable instructions to be executed on the computing device to deliver the notification to the system.

20. The system of claim 11, wherein the template is predefined and re-usable.

21. A notification system for generating and delivering notifications to subscribers, said notifications containing content provided by one or more content providers, said system comprising:
a computing device coupled to a data communication network, said computing device being configured to receive a parameter-driven template provided by a content provider via the data communication network, said template containing information provided by the content provider and relating to a subscription for notifications, said template relating to a category specified by the content provider, said template containing one or more parameters specified by the content provider, said parameters defining a plurality of events specified by the content provider and relating to the category, wherein one of the parameters in the received parameter-driven template relates to delivery of the notifications at a predetermined time of day specified by the content provider, each of said events relating to a recurring event specified by the content provider, said parameters relating to a subscription for notifications and defining a predefined scheduled generation time for the generation of notifications to occur;
a subscription store associated with the computing device, said subscription store being configured to store one or more notification offerings described by an application definition file, said application definition file being generated from the received parameter-driven template, said application definition file including the predefined scheduled generation time for the generation of notifications to occur; and
a computer-readable medium storing computer-executable instructions to be executed on the computing device to enable a notifications application to execute on a recurring basis according to the predefined scheduled generation time for the generation of notifications to occur included in the application definition file, said notifications application delivering the notification to the subscribers in accordance with the time of day delivery parameter included in the application definition file, wherein the notifications application maps the latest recurring event of the specified category to one or more subscribers as a function of the parameters specified by the content provider in the received parameter-driven template provided by the content provider.

* * * * *